(12) United States Patent
Schüle et al.

(10) Patent No.: US 6,958,558 B2
(45) Date of Patent: Oct. 25, 2005

(54) ELECTRIC MOTOR IN PARTICULAR FOR A STEERING SYSTEM IN A VEHICLE

(75) Inventors: Jürgen Schüle, Schwäbisch Gmünd (DE); Thomas Kühnhöfer, Heubach (DE); Hans Köhnle, Leinzell (DE); Rolf Martin, Mögglingen (DE)

(73) Assignee: ZF Lenksysteme GmbH, Schwaebisch Gmuend (DE)

( * ) Notice: Subject to any disclaimer, the term of this patent is extended or adjusted under 35 U.S.C. 154(b) by 63 days.

(21) Appl. No.: 10/479,104

(22) PCT Filed: May 10, 2002

(86) PCT No.: PCT/EP02/05167

§ 371 (c)(1),
(2), (4) Date: Nov. 25, 2003

(87) PCT Pub. No.: WO02/097950

PCT Pub. Date: Dec. 5, 2002

(65) Prior Publication Data

US 2004/0150274 A1 Aug. 5, 2004

(30) Foreign Application Priority Data

May 25, 2001 (DE) .......................................... 101 25 472

(51) Int. Cl.[7] .............................................. H02K 11/00
(52) U.S. Cl. .......................................... 310/71; 310/89
(58) Field of Search ............................. 310/71, 89, 254

(56) References Cited

U.S. PATENT DOCUMENTS

| 2,673,300 | A | * | 3/1954 | Furnas et al. ................. 310/71 |
| 5,386,164 | A | * | 1/1995 | Butcher et al. ............... 310/71 |
| 5,514,922 | A | | 5/1996 | Yabushita et al. |
| 5,856,717 | A | * | 1/1999 | Stimson ....................... 310/71 |
| 5,861,689 | A | | 1/1999 | Snider et al. |
| 6,132,184 | A | | 10/2000 | Robertson et al. |
| 6,194,849 | B1 | | 2/2001 | Wilson-Jones et al. |

FOREIGN PATENT DOCUMENTS

| DE | 694 10 124 T | 3/1998 |
| DE | 197 40 938 | 3/1999 |
| DE | 198 09 421 | 4/1999 |
| DE | 197 55 312 | 6/1999 |
| EP | 0 607 032 | 7/1994 |
| FR | 2 618 272 | 1/1989 |
| FR | 2 750 542 | 1/1998 |

\* cited by examiner

Primary Examiner—Thanh Lam
(74) Attorney, Agent, or Firm—Kenyon & Kenyon

(57) ABSTRACT

An electric motor comprises a stator and a rotor which is rotatably mounted in the stator, the stator having an exciter winding which can be energized via connecting contacts, in a stator housing.

The connecting contacts are permanently connected to the stator housing, electrical connecting elements which are accessible from the outside in the radial and axial directions being connected to the connecting contacts.

7 Claims, 2 Drawing Sheets

ELECTRIC MOTOR IN PARTICULAR FOR A STEERING SYSTEM IN A VEHICLE

FIELD OF THE INVENTION

The present invention relates to an electric motor, e.g., for a steering system in a vehicle.

BACKGROUND INFORMATION

Such electric motors are composed of a stator having an exciter winding which can be energized in a stator housing and a rotor which is rotatably mounted in the stator and whose rotor movement is utilized as a working movement. The energization of the exciter winding is usually carried out by soldering stranded conductors to the winding ends, which project initially out of the stator housing and which can be connected to connecting cables. In order to be able to transmit the high currents which are necessary for high motor powers, high-current plug-in connectors, via which the winding ends are connected to a control device of the electric motor, are used for the electrical connection of the electric motor.

However, the currents which are to be transmitted via the plug-in connectors are generally limited to, for example, 80 Amperes so that it is not possible to generate only very high motor powers with this connection technology. On the other hand, it is also not possible to directly connect the motor lines to the control device owing to the comparatively complex mounting.

U.S. Pat. No. 5,514,922 describes an electric motor of the type mentioned at the beginning in which the stator has an exciter winding which can be energized via connecting contacts ("conductor terminals", see "27a" in FIG. 2 of U.S. Pat. No. 5,514,922), the connecting contacts being specifically connected to the stator housing using an "annular cylindrical projection 113d", it being possible to connect electrical connection elements ("external conductor leads", see column 7, line 40) which are axially accessible from the outside to the connecting contacts ("27a"). The connecting contacts are secured by what is referred to as an "isolation base 27". This construction is therefore very costly and disadvantageous in terms of the mounting of the electric motor.

U.S. Pat. No. 5,861,689 describes an electric motor in which the connecting contacts "terminals 12" (see FIG. 12 in U.S. Pat. No. 5,861,689) are integrated into a connecting plug ("receptacle 10") which is axially accessible from the outside. This design is also extremely complex to mount.

U.S. Pat. No. 6,132,184 describes an electric motor for the hydraulic pump of a steering gear in which connecting contacts ("tubular contacts 108, 110", see FIG. 3 in U.S. Pat. No. 6,132,184) and bolt-shaped connection elements ("threaded fasteners 68, 92, 80, 58") are provided for energizing the electric motor by means of a control device ("control module 16"). The design of the connecting contacts ("tubular contacts") and of the connection elements is not described more precisely there.

The present invention is based on forming the exciter winding of an electric motor in a structurally simple manner which may permit simple mounting and a high power drain.

SUMMARY

The foregoing may be achieved by providing an electric motor as described herein.

The connecting contacts, which constitute an interface for the electrical connection to the outside, of the exciter winding are permanently connected to the stator housing so that electrically conductive connection elements which are accessible from the outside in the radial and/or axial directions may be connected to these connecting contacts. The connecting contacts may be integrated into the stator housing, as a result of which a fixed and nonreleasable connection may be provided. The winding ends of the exciter winding, which are arranged within the stator housing, may be connected to the connecting contacts from the inside. In contrast to conventional arrangements, the connecting contacts form part of the stator housing or are integrated into it here, as a result of which disruptive movable cable ends may be dispensed with.

The connecting contacts may be arranged as clamping elements to which the winding ends are crimped from the inside. Stud bolts may be inserted, e.g., screwed into the clamping elements from the outside, it being possible for the stud bolts to be connected directly to a control device on the side facing away from the stator in order to control the power supply of the electric motor. This control device may be connected to the stator housing or to a motor housing into which the stator is inserted. The control device may be seated directly on the stator housing or the motor housing and may be permanently connected thereto with the result that the control device and the electric motor form one structural unit. The stud bolts as connection elements between the control device and the connecting contacts of the stator may additionally perform the function of attachment elements which secure the control device to the motor housing or stator housing.

In particular if the connecting contacts are arranged on the axial end side of the stator housing it is possible to provide a cover cap which covers the connecting contacts and which protects the contacts against soiling. The cover cap may have cutouts through which the connection elements, in particular the stud bolts, are inserted and may be connected to the connecting contacts. The cover cap may be located in a common outer casing surface with the stator housing, which may make it easier to insert the stator axially into a radial inner space of a motor housing.

Further aspects are set forth below in the description of the figures and the drawings.

DETAILED DESCRIPTION

Identical components are provided with identical reference symbols in the following figures.

Figure 1:
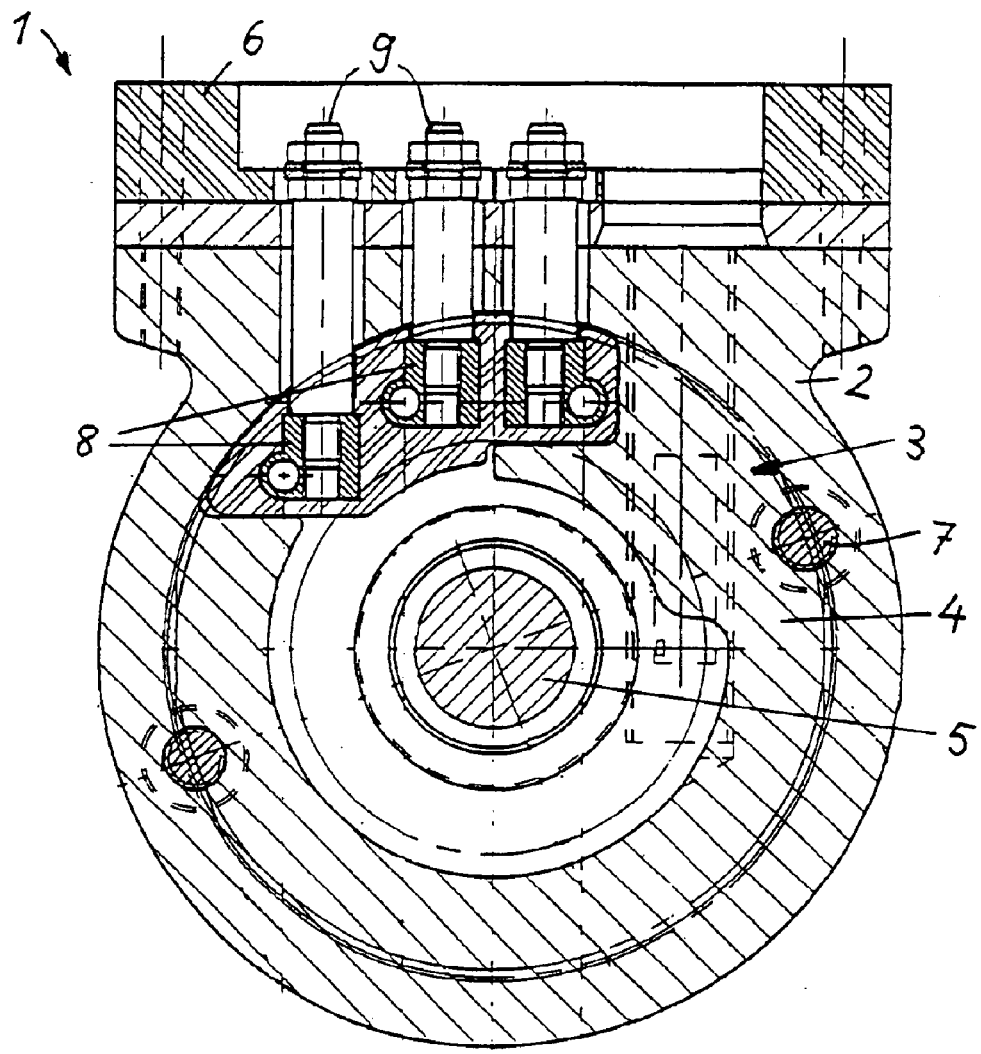
FIG. 1 is a cross-sectional view through an electric motor with a stator which is accommodated in a motor housing, and a rotor which is mounted in the stator, connecting contacts which are connected via stud bolts to a control device located on the top being provided in the region of the axial end side of the stator.

The electric motor 1 which is illustrated in FIG. 1 is, e.g., a three-phase asynchronous motor which may be used to support the steering movement in the steering system of a vehicle. The electric motor 1 includes, in a motor housing 2, a stator 3, including a stator housing 4 and an exciter winding which is arranged on the stator housing 4, as well as a rotor 5 which is rotatably mounted in the stator 3 and whose rotary movement is exploited as a working movement. The stator 3 is of cylindrical design and is inserted into a corresponding shape cutout in the motor housing 2. In order to secure the stator 3 in the motor housing 2, it is possible to provide axially extending attachment elements 7 which may bring about in particular securement with respect to rotation, but also possibly axial securement of the stator 3 in the motor housing 2.

On the upper side of the motor housing 2 there is a control device 6 which may be permanently connected to the motor housing 2 and by which the power supply and control for the exciter winding in the stator 3 is carried out.

The connection between the exciter winding in the stator 3 and the power supply and power control is carried out by the control device 6 via a total of three connecting contacts which are arranged as clamping elements 8 and to which the winding ends of the exciter winding are crimped. The clamping elements 8 are located on the axial end side of the stator housing 4 of the stator 3 and may be permanently connected to the stator housing 4. The clamping elements 8 may be formed of copper and may be cast into the stator housing 4 which may be formed of plastic. Each clamping element 8 has an internal thread into which a stud bolt 9 is screwed, which stud bolt 9 has the function of a connection element for connecting the exciter winding to the control device 6. The stud bolt 9 performs both an electrically conductive function and a securing, clamping and connecting function in order to connect the control device 6 to the motor housing 2. The total of three stud bolts 9 are read essentially radially through the motor housing 2 which engages around the stator 3, and are inserted into the clamping elements 8. All three stud bolts 9 are located parallel with one another. The stud bolts 9 connect the stator housing 4, motor housing 2 and control device 6.

Figure 2:
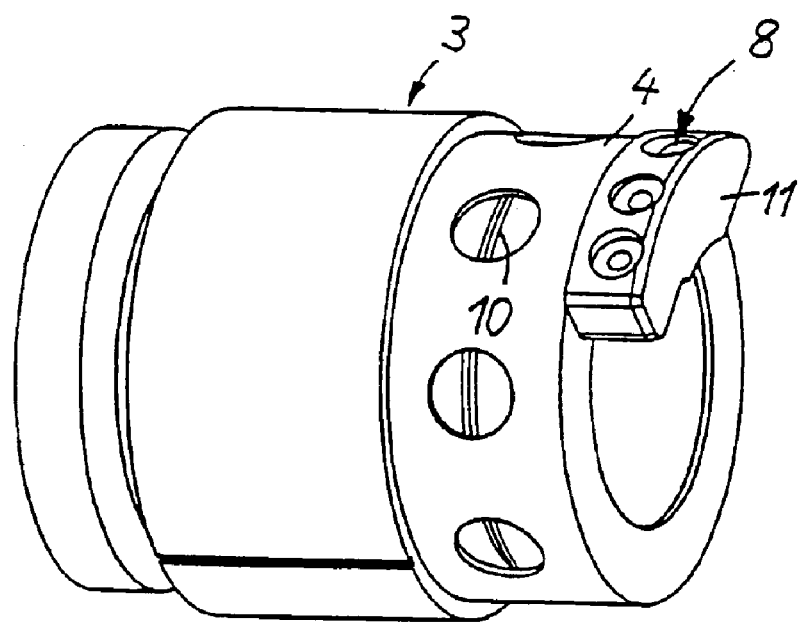
FIG. 2 is a perspective view of the stator with connecting contacts arranged on the axial end side of the stator housing.

FIG. 2 is a perspective view of the stator 3 with the clamping elements B which are attached at the end side to the stator housing 4 and are covered by a cover cap 11 which may be fitted axially displaceably onto the clamping elements 8. The cover cap 11, which may be formed of plastic and which protects the clamping elements against soiling as well as having an insulating effect, has cutouts which are matched to the clamping elements 8 and are radially accessible so that the clamping elements B are radially accessible from the outside even when the cover cap 11 is fitted on, and the stud bolts which are illustrated in FIG. 1 may be screwed in. The radially outermost casing surface of the cover cap 11 is essentially congruent with the radial outer casing surface of the stator housing 4.

FIG. 2 also shows the exciter winding 10 within the stator housing 4.

Figure 3:
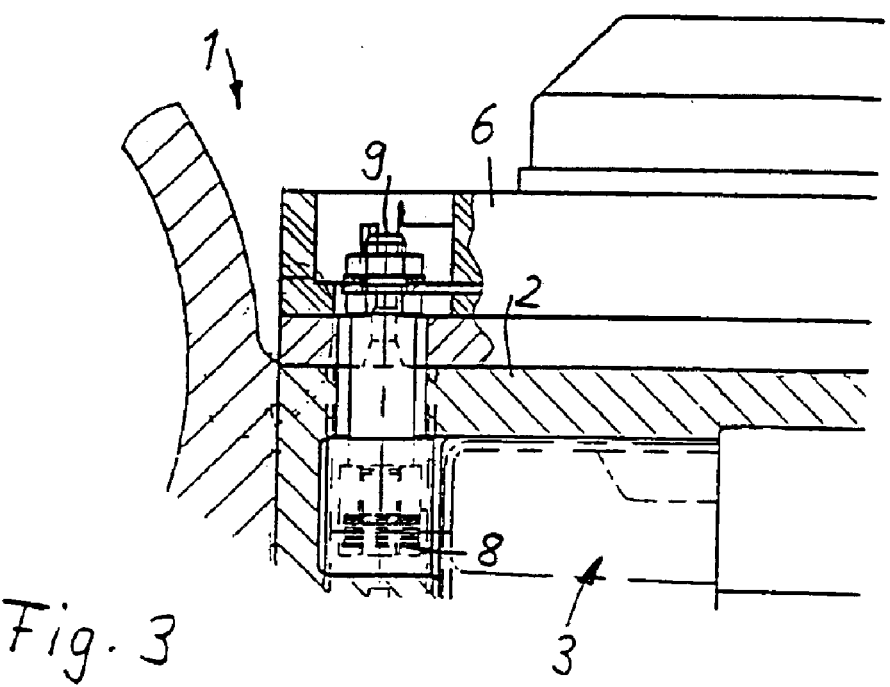
FIG. 3 is a partial view of a longitudinal section through the electric motor with the control device located on the top.

As illustrated in FIG. 3, the clamping elements 8 are located on the axial end side of the stator 3 and the motor housing 2 engages over them axially. The stud bolts 9 are led through a cutout in the control device 6, which is attached to the motor housing 2, and are cutout in the motor housing, and screwed into the clamping elements B.

Figure 4:
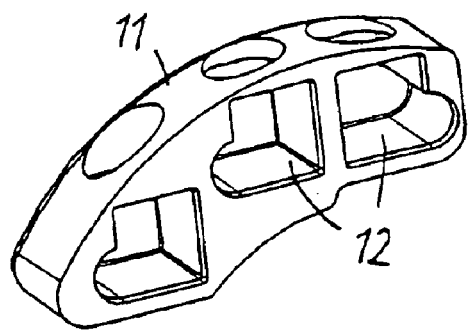
FIG. 4 is a perspective view of a cover cap which may be fitted axially onto the connecting contacts.

FIG. 4 illustrates the cover cap 11 in isolation. The radially outer casing surface of the cover cap 11 is curved and has a radius which corresponds essentially to the radius of the stator housing of the stator. A total of three cutouts, in which the clamping elements B are held in the installation position, is provided in the cover cap 11. The cutouts 12 are accessible both axially and radially, the axial openings corresponding to the shape of the clamping elements so that the cover cap 11 may be fitted axially onto the clamping elements, whereas the radial openings in the cross section are of round design and have a purpose of accommodating the stud bolts.

LIST OF REFERENCE NUMERALS

1 Electric motor
2 Motor housing
3 Stator
4 Stator housing
5 Rotor
6 Control device
7 Attachment element
8 Clamping element
9 Stud bolt
10 Exciter winding
11 Cover cap
12 Cutout

What is claimed is:

1. An electric motor, comprising:

a stator housing;

electrical connection elements;

connecting contacts connected to the stator housing, the connecting contacts configured to be connected to the electrical connection elements accessible from outside in directions to be connected, the connecting contacts integrated into the stator housing and forming part of the stator housing, the connecting contacts arranged as clamping elements cast into the stator housing;

a stator arranged in the stator housing and including an exciter winding energizable via the connecting contacts; and a rotor rotatably mounted in the stator;

wherein the electrical connection elements include stud bolts insertable into the clamping elements.

2. The electric motor according to claim 1, wherein the electric motor is configured for a steering system in a vehicle.

3. The electric motor according to claim 1, wherein the connecting contacts are arranged on an axial end side of the stator housing and are radially accessible from the outside.

4. The electric motor according to claim 1, wherein the stator is insertable into a motor housing, the connecting contacts accessible from the outside through radial openings in the motor housing.

5. The electric motor according to claim 1, wherein the connection elements to the connecting contacts project on a side facing away from the connecting contacts into a control device connected to the stator housing.

6. The electric motor according to claim 1, further comprising a cover cap arranged to cover the connecting contacts.

7. The electric motor according to claim 1, wherein the electric motor is arranged as a three-phase asynchronous motor.

* * * * *